United States Patent [19]

Buerhop

[11] Patent Number: 4,783,030
[45] Date of Patent: Nov. 8, 1988

[54] APPARATUS FOR THE MECHANICAL DECOUPLING OF PIPING SYSTEMS

[75] Inventor: Hans Buerhop, Erlangen, Fed. Rep. of Germany

[73] Assignee: Kraftwerk Union Aktiengesellschaft, Müheim/Ruhr, Fed. Rep. of Germany

[21] Appl. No.: 30,740

[22] Filed: Mar. 25, 1987

[30] Foreign Application Priority Data

Mar. 26, 1986 [DE] Fed. Rep. of Germany ....... 3610331

[51] Int. Cl.$^4$ .............................................. F16L 3/08
[52] U.S. Cl. ...................................... 248/744; 248/49
[58] Field of Search ...................... 248/49, 744, 65, 58, 248/55, DIG. 1; 285/419, 373

[56] References Cited

U.S. PATENT DOCUMENTS 3,539,137 10/1970 March .
3,936,001 2/1976 Clendaniel ........................... 248/58
4,513,934 4/1985 Pruyne ................................. 248/49

FOREIGN PATENT DOCUMENTS 0385116 2/1965 Switzerland .
2088515 11/1980 United Kingdom .

OTHER PUBLICATIONS

Heating/Piping/Air Conditioning, vol. 57, No. 12, Dec. 1985.

Chemical Engineering, vol. 73, Feb. 14, 1966.

Primary Examiner—Ramon O. Ramirez
Attorney, Agent, or Firm—Herbert L. Lerner; Laurence A. Greenberg

[57] ABSTRACT

An apparatus for the mechanical decoupling of a piping system including a pipe line having at least one connecting pipe section with a connecting point and straight pipe line sections connected to and protruding in different directions from the connecting point, includes first holders in the form of commercially available pipe clams firmly connected to a building and distributed at given equal spacings depending on the load-carrying capacity of the pipes exclusively for supporting the pipe lines of the piping system; second fixed-point holders in the form of commercially available pipe clamps disposed in the vicinity of the connecting pipe section including second fixed-point holders directly adjacent the connecting point, at least one of the second fixed-point holders being disposed at each of the respective pipe line sections and three of the second fixed-point holders each being disposed at a respective corner of a triangle for immovably holding the pipe lines and enabling vibrations of the piping system to be calculated, and the pipe clams forming the second fixed-point holders directly adjacent the connecting point being spaced apart from each other and from the connecting point by a spacing substantially shorter than the given spacings.

3 Claims, 3 Drawing Sheets

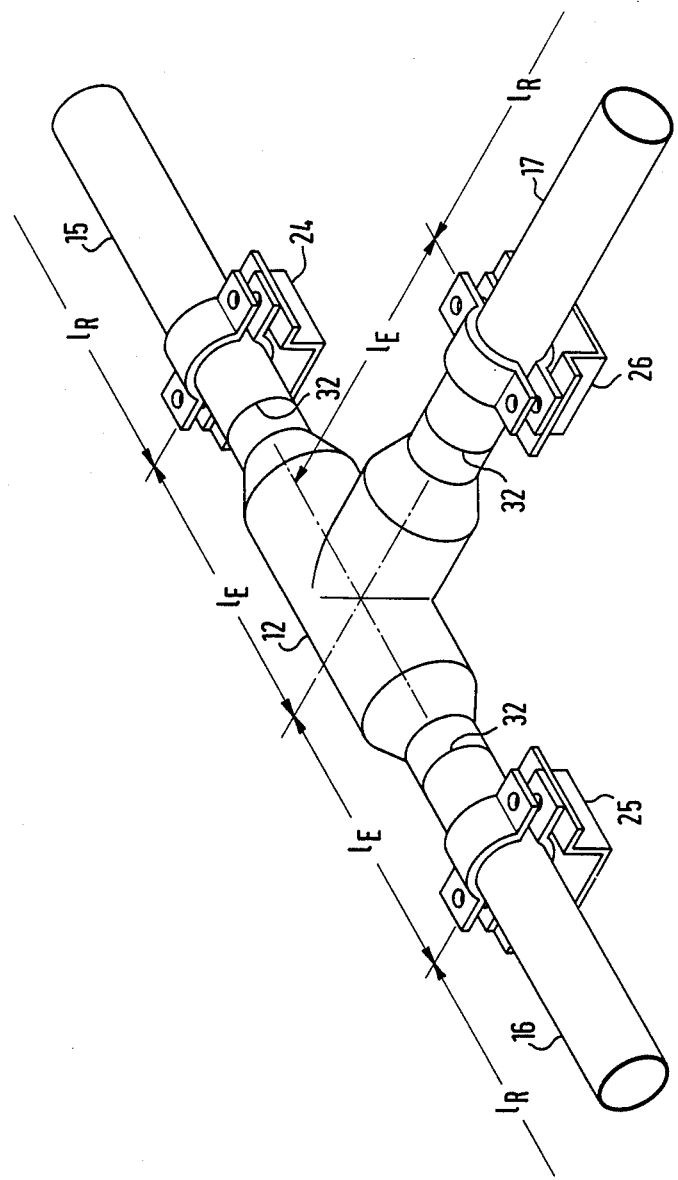

APPARATUS FOR THE MECHANICAL DECOUPLING OF PIPING SYSTEMS

The invention relates to an apparatus for the mechanical decoupling of piping systems which include at least one connecting pipe section with a connecting point and straight piping sections connected to and protruding from the connecting point, wherein pipe lines of the piping system are supported in first holders firmly connected to a building and distributed at equal spacings depending on the load-carrying capacity of the pipes, and the pipe lines are kept immovable by at least one fixed-point support, so that vibrations of the piping system can be calculated.

Various kinds of external forces act upon piping systems. The deflections of the pipes caused by these forces can only be picked up and calculated with very great effort. In order to make large piping systems accessible to a simple calculation, it is customary to subdivide the systems with suitable decoupling devices.

One conventional device for the mechanical decoupling of a piping system is formed of an expensive, heavy, shaped fixed-point piece of steel which is anchored in the steel-concrete structure of a building and encompasses a pipe of the piping system over a given length. Such a shaped fixed-point piece ensures that the pipeline is not deflected at the fixed point, even by the largest possible external forces.

In large piping systems, large forces occur which require a very stable and therefore heavy shaped fixed-point piece. Such a shaped fixed-point piece requires a large manufacturing effort sicne besides the large amount of material required, every shaped piece must be fabricated individually. In addition, a large effort is required in the installation because of the great weight of the shaped piece. A lifting crane is always required for this purpose. In addition, shaped pieces of such wieght can only be fastened to the steel concrete structure of a building with a large amount of effort expended on mechanical design.

It is accordingly an object of the invention to provide an apparatus for the mechanical decoupling of piping systems, which overcomes the hereinafore-mentioned disadvantages of the heretofore-known devices of this general type, in which simple and light-weight supports for the pipelines are sufficient and which nevertheless assures that a fixed point required for calculating the piping system will be provided. The amount of labor and material required is to be reduced distinctly as compared to the use of shaped fixed-point pieces.

With the foregoing and other objects in view there is provided, in accordance with the invention, an apparatus for the mechanical decoupling of a piping system, the piping system including a pipe line having at least one connecting pipe section with a connecting point and straight pipe line sections connected to and protruding in different directions from the connecting point, the apparatus comprising first holders in the form of commercially available pipe clamps firmly connected to a building and distributed at given equal spacings depending on the load-carrying capacity of the pipes exclusively for supporting the pipe lines of the piping system, second fixed-point holders in the form of commercially available pipe clamps disposed in the vicinity of the connecting pipe section including second fixed-point holders directly adjacent the connecting point, and at least one of the second fixed-point holders being disposed at each of the respective pipe line sections and three of the second fixed-point holders each being disposed at a respective corner of a triangle for immovably holding the pipe lines and forming a fixed-point enabling vibrations of the piping system to be calculated, and the pipe clamps forming the second fixed-point holders being spaced apart from each other and from the connecting point by a spacing substantially shorter than the given spacings between the first holders.

Such an apparatus for the mechanical decoupling of a piping system acts like a highpass filter between the parts of the system. Although each individual commercially available pipe clamp is not capable of preventing possible vibrations of the pipe, a fixed point required for the calculation of the piping system is assured by the combination of three such pipe clamps which are disposed within short spacings from each other, at the corners of a triangle. The advantage achieved thereby is that the fixed point for the mechanical decoupling of a piping system can be produced economically with commercially obtainable pipe clamps. In addition, these pipe clamps are substantially lighter than the prior art shaped fixed-point pieces and are therefore easier to handle.

In accordance with another feature of the invention, the connecting pipe section is a pipe elbow, the connecting point is an apex of the pipe elbow, the straight pipe line sections are in the form of two straight pipe line sections connected to the connecting point, and the second fixed-point holders are in the form of two second fixed-point holders disposed on one of the pipe line sections and one fixed-point holder disposed at the other of the pipe line sections.

The apex of the pipe elbow is defined as the point at which the imaginary extensions of the straight piping sections intersect. In the vicinity of the pipe elbow, a fixed point is formed by two pipe clamps disposed ahead of the pipe elbow and one disposed behind the pipe elbow at the straight piping sections. An equivalent fixed point is formed if one pipe clamp is positioned ahead and two are positioned behind the pipe elbow. The spacings between the apex of the pipe elbow and the two pipe clamps adjacent the pipe elbow are substantially shorter than the spacings of the holders serving exclusively for support. The two pipe clamps of the fixed point immediately adjacent at the straight pipeline section have the same short spacing.

In every piping system, there are many pipe elbows. A device for the mechanical decoupling of the piping system according to the invention can be attached at any or all of such elbows.

In accordance with a further feature of the invention, the connecting pipe section is a tee, the connecting point is a branching point of the tee, the straight pipe line sections are in the form of three straight pipe line sections connected to the connecting point, and the second fixed-point holders are in the form of three second fixed-point holders each being disposed on a respective one of the pipe line sections.

The fixed point is formed by a respective pipe clamp in each of the pipeline sections adjoining the T-section. The spacings between the branching point of the T-section and the three adjacent pipe clamps are substantially shorter than the spacings of the remaining holders which serve exclusively for support.

In a large piping system, there are several branchings. Therefore, in addition to the locations in the vicinity of the pipe elbows, there are many other places for installing the apparatus for the mechanical decoupling of the piping system according to the invention. Otherwise, in most cases a single apparatus for mechanical decoupling is sufficient for the necessary calculation of the piping system.

Every piping system contains pipe elbows and as a rule, T's as well. The apparatus for the mechanical decoupling of the piping system according to the invention can consequently be used in any piping system.

In order to ensure that the three pipe clamps forming the corners of a triangle cooperate in such a manner that a fixed point is formed, the distance between the connecting point of the piping sections pointing in different directions and the adjacent pipe clamps, as well as the distances between two directly adjacent fixed-point pipe clamps at a pipe line section are substantially shorter than the spacings of the other holders.

In accordance with a concomitant feature of the invention, the spacings between the second fixed-point holders directly adjacent each other and between the second fixed-point holders directly adjacent the connecting point and the connecting point, are between 9 and 11 hundredths of the given spacings of the first holders.

A fixed point which is stable for the calculation of the piping system is assured if the spacings within the apparatus according to the invention are between 9 and 11 hundredths of the distance between the other holders of the piping system which are disposed at equal distances and serve exclusively for support.

The regular spacings between the holders of the piping system are given and depend on the material, the wall thickness and the diameter of the pipes. According to the invention, the spacings within the decoupling apparatus are in said proportion to the regular spacings. The advantage of such an apparatus is that a stable fixed point at the piping system can be constructed with simple, commercially available pipe clamps which are easy to handle and install. The spacings within the decoupling apparatus according to the invention are so large that the welded seams at the pipe elbow and at the tee are accessible at any time, even for welded-seam test equipment.

An advantage of the invention is that a fixed point in the system which is required for calculating the piping system can be readily provided by simple means.

Other features which are considered as characteristic for the invention are set forth in the appended claims.

Although the invention is illustrated and described herein as embodied in an apparatus for the mechanical decoupling of piping systems, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings:

FIG. 4 is a perspective view which is not to scale, of the apparatus according to FIG. 2.

Figure 1:
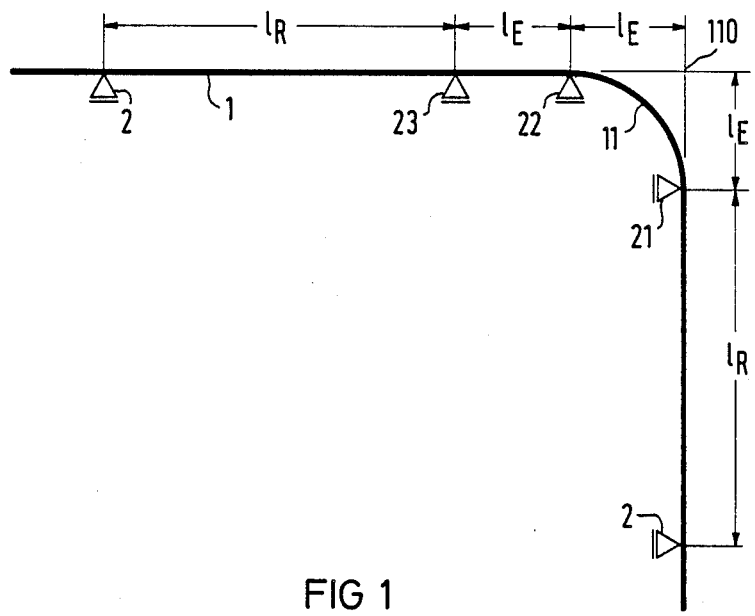
FIG. 1 is a diagrammatic plan view on a distorted scale of an apparatus for the mechanical decoupling of a piping system according to the invention, as seen in the region of a pipe elbow.
Figure 2:
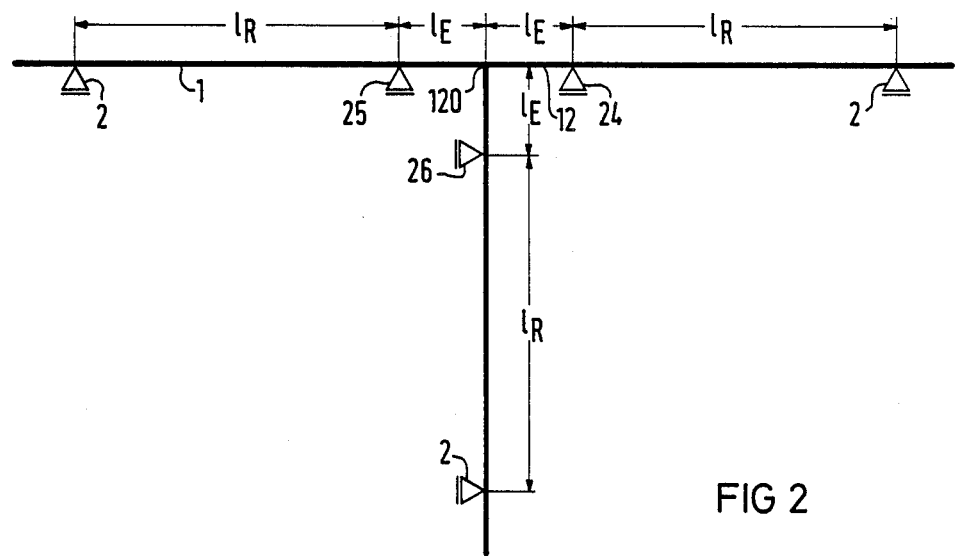
FIG. 2 is plan view on a distorted scale of an apparatus for the mechanical decoupling of a piping system according to the invention, as seen in the vicinity of a tee which forms a branching of the pipe lines.

Referring now to the figures of the drawings in detail and first, particularly, to FIGS. 1 and 2 thereof, there are seen pipe lines 1 of a piping system which are firmly connected to a building by first holders 2. A holder spacing 1R between the holders is fixed by mechanical properties of the pipes. With identical pipes, the holder spacing 1R is constant. The sytems are subdivided by suitable decoupling apparatus, so that large piping systems are also accessible to calculation. The apparatus for mechanical decoupling according to the invention is formed of second fixed-point holders in the form of three commercially available pipe clamps 21 to 23 or 24 to 26 which are disposed in a space that is small as compared to the holder spacing 1R, in such a manner that they form the corners of a triangle.

According to FIG. 1, the apparatus of the invention is disposed in the vicinity of a connecting pipe section in the form of a pipe elbow 11. The pipe clamps 21 and 22 adjacent the pipe elbow 11 are located at distances 1E from the apex connecting point 110 of the pipe elbow 11 of the pipeline 1. The third pipe clamp 23 is disposed at one of the straight legs of the pipe line 1 at the distance 1E from the adjacent pipe clamp 22. The distance 1E within the apparatus for mechanical decoupling according to the invention is one-tenth of a holder spacing 1R required in the rest of the piping system.

In order to decouple a piping system in the vicinity of a connecting pipe section in the form of a tee 12 which forms a branching according to FIG. 2, commercially available pipe clamps 24 to 26 are each disposed at the distance 1E from a branching or connecting point 120. The three pipe clamps 24 to 26 form the corners of a triangle. The distances 1E from the clamps to the branching point 120 are one-tenth of the holder spacing 1R of the piping system.

Simple commercially available pipe clamps 21 to 23 and 24 to 26 disposed at the corners of a triangle with spacings according to the invention, cooperate in such a manner that they form a fixed point which decouples the piping system mechanically. The piping system becomes accessible to calculation in a simple and cost-effective manner due to such a fixed point provided according to the invention.

Figure 3:
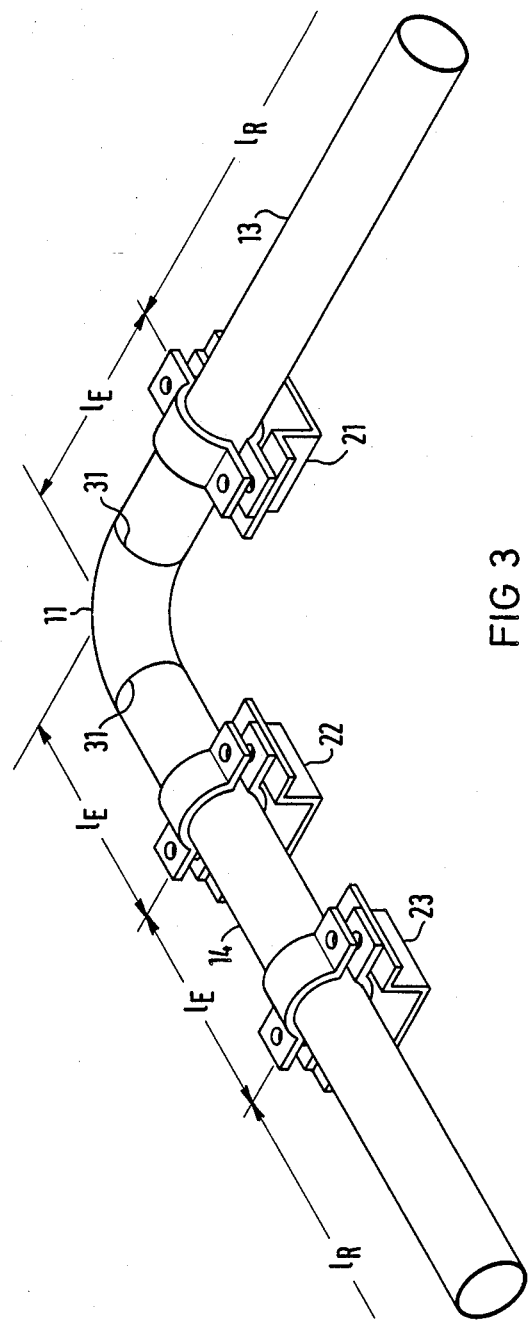
FIG. 3 is a perspective view which is not to scale, of the apparatus according to FIG. 1.

FIG. 3 is a perspective view of an apparatus according to the invention for the mechanical decoupling of a piping system which is disposed in the vicinity of a pipe elbow 11, according to FIG. 1. The pipe elbow 11 is welded to straight pipe sections 13 and 14 by welded seams 31. The commercially available pipe claims 21 and 22 are attached to the straight pipe sections 13 and 14 on both sides of the pipe elbow 11. According to the invention, the distance 1E from the apex 110 of the pipe elbow 11 to the clamps 21, 22 is sufficiently great, so that the welded seams 31 can be examined at any time even with test equipment. The third pipe clamp 23 which forms the apparatus according to the invention together with the other two pipe clamps 21 and 22, is disposed on the straight pipe section 14 at the distance 1E from the pipe clamp 22. The pipe clamp 23 can also be disposed on the straight pipe section 13 at the distance 1E from the pipe clamp 21.

An apparatus according to the invention for a mechanical decoupling of a piping system in the vicinity of a pipe line branching is shown in the perspective view of FIG. 4. In FIG. 4, the branching is in the form of a T-section 12, to which straight pipe sections 15, 16 and 17 are welded. According to the invention, the three pipe clamps 24 to 26 disposed on the straight pipe sections 15, 16 and 17 are disposed at the distance 1E from the branching point 120 in the T-section 12. The distance 1E according to the invention is so large that welded seams 32 between the tee 12 and the straight pipe sections 15, 16 and 17 can be checked at any time even with test equipment.

According to the invention, the pipe clamps 21 to 23 and 24 to 26 are disposed at the piping system in such a way that they form the corners of a triangle. Therefore, a decoupling apparatus according to the invention is disposed in the vicinity of the pipe elbow 11 or the tee 12. The apparatus including the pipe clamps 21 to 23 or 24 to 26 in the form of a triangle and the physical spacings within this apparatus cooperate in such a way that mechanical decoupling of a piping system is achieved which is equivalent to that of a stiff fixed point.

The foregoing is a description corresponding in substance to German Application P 36 10 331.4, dated Mar. 26, 1986, the International priority of which is being claimed for the instant application, and which is hereby made part of this application. Any material discrepancies between the foregoing specification and the aforementioned corresponding German application are to be resolved in favor of the latter.

I claim:

1. Apparatus for the mechanical decoupling of a piping system, the piping system including a pipe line having at least one connecting pipe section with a connecting point and straight pipe line sections connected to and protruding in different directions from the connecting point, the apparatus comprising first holders in the form of commercially available pipe clamps firmly connected to a building and distributed at given equal spacings depending on the load-carrying capacity of the pipes exclusively for supporting the pipe lines of the piping system, second fixed-point holders in the form of commercially available pipe clamps disposed in the vicinity of the connecting pipe section including second fixed-point holders directly adjacent the connecting point, and at least one of said second fixed-point holders being disposed at each of said respective pipe line sections adjacent said connecting pipe section and three of said second fixed-point holders including said second fixed-point holders disposed at said pipe line sections each being disposed at a respective corner of a triangle for immovably holding the pipe lines and forming a fixed-point enabling vibrations of the piping system to be calculated, and said pipe clamps forming said second fixed-point holders being spaced apart from each other and from said connecting point by spacings, said spacings between said second fixed-point holders directly adjacent each other, and between said second fixed-point holders directly adjacent the connecting point and the connecting point, being between 9 and 11 hundredths of said given spacings between the first holders.

2. Apparatus according to claim 1, wherein the connecting pipe section is a pipe elbow, the connecting point is an apex of the pipe elbow, the straight pipe line sections are in the form of two straight pipe line sections connected to the connecting point, and said second fixed-point holders are in the form of two second fixed-point holders disposed on one of said pipe line sections and one fixed-point holder disposed at the other of said pipe line sections.

3. Apparatus according to claim 1, wherein the connecting pipe section is a tee, the connecting point is a branching point of the tee, the straight pipe line sections are in the form of three straight pipe line sections connected to the connecting point, and said second fixed-point holders are in the form of three second fixed-point holders each being disposed on a respective one of said pipe line sections.

* * * * *